United States Patent [19]
Campbell

[11] 3,756,122
[45] Sept. 4, 1973

[54] MACHINE TOOL TRACER

[76] Inventor: Paul J. Campbell, c/o The New England Machine and Tool Company, 758 Four Rod Rd., Moodus, Conn. 06037

[22] Filed: June 4, 1971

[21] Appl. No.: 150,063

[52] U.S. Cl. .............. 90/62 A, 33/23 K, 33/172 E, 250/231 R
[51] Int. Cl. ............................................ B23q 35/26
[58] Field of Search .................... 90/62 A; 82/14 B; 250/231 R; 33/172 E, 23 K

[56] References Cited
UNITED STATES PATENTS

| | | | |
|---|---|---|---|
| 3,229,587 | 1/1966 | Chauvel | 90/62 A |
| 3,557,379 | 1/1971 | Kelsey | 250/231 R |
| 2,704,956 | 3/1955 | Johnson | 90/62 A |
| 2,410,093 | 10/1946 | Martinec | 33/172 E |
| 2,086,153 | 7/1937 | Bickel | 90/62 A |

*Primary Examiner*—Andrew R. Juhasz
*Assistant Examiner*—Z. R. Bilinsky
*Attorney*—Prutzman, Hayes, Kalb & Chilton

[57] ABSTRACT

A contour milling machine having profile and depth tracers with tracing styli adapted to be displaced by workpiece templates for controlling the relative position of a machine cutter and a workpiece. A photoelectric signaling device of each tracer comprising a stationary mask and a movable mask operable by the respective tracing stylus is operable to generate an electric signal for controlling the relative position of the workpiece and cutter in accordance with the displacement of the tracing stylus.

19 Claims, 10 Drawing Figures

Patented Sept. 4, 1973

INVENTOR
PAUL J. CAMPBELL

BY Pratzman, Hayes, Kalb and Chilton
ATTORNEYS

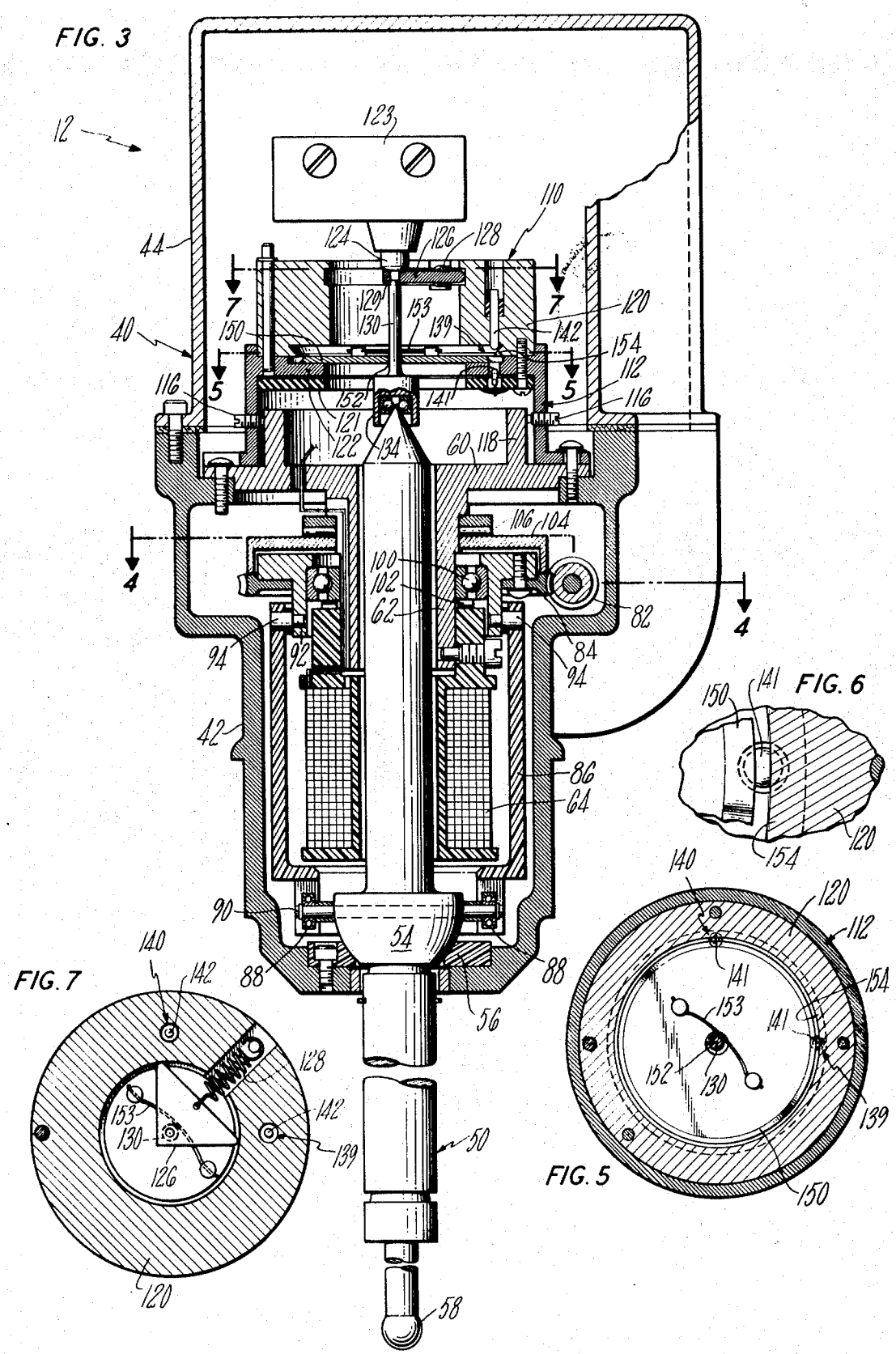

Patented Sept. 4, 1973

MACHINE TOOL TRACER

BRIEF SUMMARY OF THE INVENTION

The present invention relates generally to machine tool tracers of the type having a tracing stylus cooperable with a suitable template for controlling the relative position of a machine tool cutter and a workpiece for machining the workpiece in accordance with the contour of the template.

It is a primary aim of the present invention to provide in a machine tool tracer of the type described a new and improved signal generating means operable by the tracing stylus for generating a control signal for controlling the relative position of a machine tool cutter and a workpiece. It is a more specific aim of the present invention to provide a new and improved photoelectric signal generating device useful in a profile tracer for two dimensional control of the contour of a workpiece and in a depth tracer for controlling the workpiece contour along a third dimension.

It is another aim of the present invention to provide new and improved profile and depth tracers useful alone or in combination in a machine tool such as a milling machine for controlling the relative position of a machine tool cutter and a workpiece.

It is a further aim of the present invention to provide a new and improved profile tracer of the type shown and described in U. S. Pat. No. 2,704,956 of Clarence Johnson dated Mar. 29, 1955 and entitled "Contouring Control Mechanism" which is cooperable with a suitable template for accurately machining a workpiece in accordance with the profile of the template.

It is a still further aim of the present invention to provide a new and improved depth tracer for controlling the depth of cut of a machine tool cutter.

Other objects will be in part obvious and in part pointed out more in detail hereinafter.

A better understanding of the invention will be obtained from the following detailed description and the accompanying drawings of illustrative applications of the invention.

BRIEF DESCRIPTION OF THE DRAWINGS

In the drawings:

FIG. 3 is an enlarged front elevation section view, partly broken away and partly in section, of the profile tracer;

FIG. 5 is a transverse section view, partly in section, of the profile tracer taken substantially along line 5—5 of FIG. 3;

FIG. 6 shows an enlargement of a portion of the section view of FIG. 5;

FIG. 7 is a transverse section view, partly in section, of the profile tracer taken substantially along line 7—7 of FIG. 3;

BRIEF DESCRIPTION OF THE PREFERRED EMBODIMENTS

Figure 1:
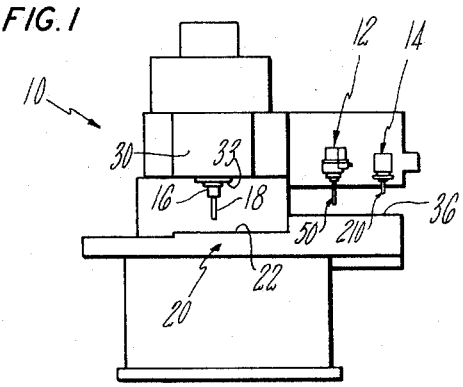
FIG. 1 is a front elevation view of a milling machine having profile and depth tracers incorporating embodiments of the present invention.

Referring now to the drawings in detail wherein like numbers represent like parts throughout the several figures, an automatic contour milling machine 10 having a profile tracer 12 and a depth tracer 14 incorporating embodiments of the present invention is shown comprising a single vertical spindle 16 for supporting a suitable cutter 18 for cutting a workpiece (not shown) supported on a workpiece support 20 of a table 22. The table 22 is mounted on suitable ways (not shown) for being laterally positioned by a feed screw 26 (FIG. 2) driven by a suitable high torque, low speed, reversible DC motor 27. A cross slide 30 operated by a similar motor driven feed screw 32 (FIG. 2) provides for positioning the cutter 18 fore-and-aft relative to the table 22, and a spindle slide 33 provides for positioning the cutter 18 vertically relative to the table 22.

The profile tracer 12 and depth tracer 14 are mounted for fore-and-aft and vertical movement with the spindle slide 33 for cooperation with suitable templates mounted on a raised template support 36 of the table for controlling the lateral position of the table table 22 (along an X axis), the fore-and-aft position of the cross slide 30 (along a Y axis) and the vertical position of the spindle slide (along a Z axis). More particularly the profile tracer 12 is operable to control the lateral position of the table 22 and the fore-and-aft position of the cross slide 30, and the depth tracer 14 is operable for controlling the vertical position of the spindle slide 33. As is well known, the profile and depth tracers 12, 14 may be independently used or be simultaneously used for combined profile and depth contour control.

Referring to FIGS. 3–7, the profile tracer 12 comprises a multi-part housing or frame 40 with a lower support 42 and an upper cover 44 detachably secured to the lower support 42. A depending tracer spindle 50 is mounted on the lower support 42 for pivotal movement from its normal or vertical axis by a "ball" 54 provided on the spindle and an annular nylon socket or seat 56 for the "ball" 54 mounted on the support 42. The tracing spindle 50 has a detachable stylus 58 engageable with a suitable template for pivoting the spindle 50 and for thereby controlling the relative position of the cutter 18 and workpiece along the X and Y axes as explained more fully hereinafter.

An intermediate support piece 60 secured to the upper end of the lower support 42 has a depending collar 62 loosely receiving the spindle 50 for permitting limited pivotal movement thereof. An annular coil assembly 64 is mounted on the lower end of the collar 62 for magnetizing the stylus 58, for which purpose the spindle 50, including its stylus 58, are made of a suitable magnetically permeable material. Also, the associated template (not shown) is made of a suitable magnetically permeable material to provide for magnetically attracting the stylus 58 into engagement with the template.

For the reasons described in more detail in the aforementioned U. S. Pat. No. 2,704,956, the spindle 50 is rotated for automatically feeding the stylus 58 along the associated template and as a result for feeding the cutter 18 laong the workpiece (in a direction which depends on the direction of rotation of the spindle 50). In the shown embodiment the spindle 50 is driven by a suitable reversible motor (not shown) through a pulley drive 80 (FIG. 4), worm 82, worm wheel 84, a depending plastic drive sleeve 86 (FIG. 3) and a pair of ball bearings 88 mounted on a shaft 90 extending diametrically through the spindle "ball" 54. The ball bearings 88 are received within axially extending diametrically opposed slots in the drive sleeve 86, and the sleeve 86 is pivotally mounted by pins 94 on a worm wheel support ring 92 (for pivotal movement about an axis parallel to the axis of the shaft 90) for permitting unimpaired pivotal movement of the spindle 50 while it is rotated. The worm wheel support 92 is rotatably mounted on the collar 62 by a ball bearing 100, and a wave spring 102 is mounted between the upper edge of the coil assembly 64 and the inner race of the ball bearing 100 to bias a cover 104 (supported on worm wheel 84) against a roller thrust bearing 106.

A photoelectric signaling device 110 having an inverted support cup 112 is mounted on the intermediate support piece 60 and secured to the lower support 42 therewith. Two 90° spaced pairs of diametrically opposed set screws 116 are mounted on the support cup 112 for engagement with an upstanding annular flange 118 of the support piece 60 for accurately positioning the signaling device 110 coaxially with the spindle 50 (with the spindle in its normal or vertical position). Upper and lower support rings 120, 121 of the signaling device 110 are mounted on opposite sides of a base 122 of the inverted cup 112, and a limit switch 123 is suitably mounted on the housing cover 44 with its operating button 124 substantially coaxial with the spindle 50. A pivotal triangular locating plate 126 having outer edges received within an annulus in the ring 120 and held in position (in engagement with the switch button 124) by a tension spring 128 provides a seat 129 for the upper end of a control pin 130 having an enlarged lower head with a ball bearing 134 engaging an upper conical edge of the spindle 50. The switch 123 is suitably connected for deactivating the milling machine 10 and is mounted so that the switch is actuated to deactivate the machine when the control pin 130 is raised approximately 0.02 inches. The "ball" 54 and its supporting seat 56 are contoured to axially raise the control pin 130 and to thereby depress the switch button 124 sufficiently to deactivate the milling machine when the spindle is pivoted some predesigned maximum limit. Accordingly, if the stylus 58 were deflected for example 0.005 inches, the switch 123 would be actuated to deactivate the machine.

A pair of substantially identical photoelectric units 139, 140, each comprising a radiant energy transmitting diode 141 and a photoelectric receiver diode 142, are provided for respectively sensing tracing stylus deflection in the lateral direction (along the X axis) and in the fore-and-aft direction (along the Y axis). The two photoelectric units 139, 140 are angularly spaced 90° and positioned relative to the vertical axis of the spindle 50 for sensing the components along the X and Y axes respectively of the deflection of the stylus 58. The transmitter diode 141 may for example be a Gallium-Arsenide Infrared Emitter Diode No. 40598A sold by Radio Corporation of America and the photoelectric receiver diode 142 may for example be a LS-400 N-P-N Planar Silicon Photo Diode sold by Texas Instruments Inc. The transmitter diode 141 and receiver diode 142 are mounted in axial alignment on the support rings 121, 120 respectively on an axis parallel to the vertical axis of the spindle 50, and suitable 90° spaced openings are provided on the base 122 for receiving the transmitter diodes 141.

A flat annular shutter disc or masking ring 150 having an inner circular tapered edge defining a central opening 152 snugly receiving the control pin 130 is mounted on the cup base 122 for being laterally shifted by the control pin 130. A leaf spring 153 is mounted on the disc 150 for engagement with the control pin 130 for preventing play between the control pin and disc. The disc 150 is accurately machined and is provided with an outer circular tapered edge for variably masking the infrared transmitter diodes 141 as the disc 150 is shifted by the spindle 50. Also, an outer stationary circular mask 154 is formed on the support ring 120 for masking an outer peripheral portion of the infrared transmitter diodes 141. The stationary circular mask 154 covers or masks an outer approximately one-third portion of each infrared transmitter diode 141 and the inner mask 150 provides for masking an inner approximately one-third portion of each infrared transmitter diode 141 when the spindle 50 is vertical. Accordingly an approximately one-third central portion of each infrared transmitter diode 141 is unmasked or exposed with the stylus centered.

Figure 2:
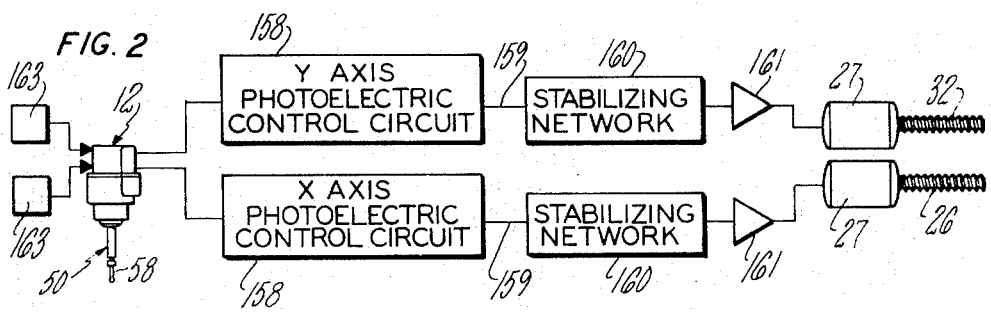
FIG. 2 is a generally diagrammatic view of a profile tracer control system of the milling machine.
Figure 4:
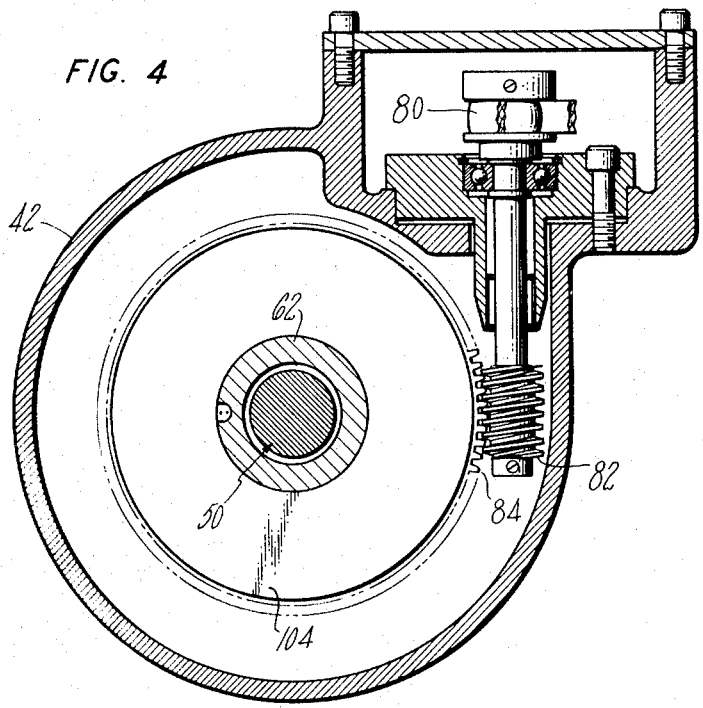
FIG. 4 is a transverse section view, partly broken away and partly in section, of the profile tracer taken substantially along line 4—4 of FIG. 3.

When the stylus 58 is deflected in one direction, the inner mask 150 is shifted in the opposite direction (by approximately the same amount) to vary the unmasked or active area of one or both of the infrared transmitter diodes 141 (depending on the direction of deflection of the stylus 58). Referring to FIG. 2, each photoelectric receiver diode 142 forms a part of a suitable control circuit 158 operable for generating an output signal voltage (in a lead 159) having a magnitude proportional to the magnitude of the deflection of the tracer stylus 58 and a polarity (plus or minus) dependent upon the direction of deflection of the stylus 58 from its normal or center position. The output signal voltage from the control circuit 158 is modified with respect to time by a suitable servo-stabilizing network 160 and applied to the input terminals of a suitable servo power amplifier 161 for operating the respective feed motor 27 in the appropriate direction (for returning the tracer spindle to its vertical or normal position) and at a speed and torque depending on the magnitude and the rate of change of deflection of the stylus 58. Each photosensitive diode 142 is arranged in its respective control circuit 158 in such a way that the output signal voltage from the circuit 158 is zero when the radiant energy reaching the diode 142 is at a pre-established mid range value and departs significantly from zero in response to a very small departure in the amount of radiant energy from said mid range value. Typically, a deflection of the stylus 58 of 0.0001 inches from its normal or center position is sufficient to cause enough change in light intensity reaching the diode 142 to operate the feed motor 27. Thus, the photoelectric control provides for operating each motor 27 in both directions without any deadband at reversal for continually moving the respective tracer stylus towards center. Also, the photoelectric control is manually adjustable for accurately presetting the motor reversal at the tracer stylus center position. For this purpose a manually adjustable potentiometer or regulator 163 is provided for controlling the intensity of the infrared emitter diode 141 and for thereby setting the intensity of the infrared radiation reaching the photosensitive diode 142 when the tracer spindle 50 is vertical, to a value that brings the output of circuit 160 to zero volts.

As indicated the opposed edges of the movable and stationary masks 150, 154 have a lateral separation equal to approximately one-third the diameter of the infrared transmitter diode 141 when the tracer spindle 50 is centered (whereupon the masks 150, 154 block a majority of the peripheral relatively low intensity radiant energy from the transmitter diode 141) to substantially increase the percentage change in radiant energy reaching the photoelectric receiver diode 142 for any given lateral deflection of the stylus 58 from center. Accordingly the sensitivity and responsiveness of the tracer is substantially increased and, it has been found, the profile tracer is sufficiently responsive to provide for profile tracing within a 0.0001 inch accuracy.

Figure 8:
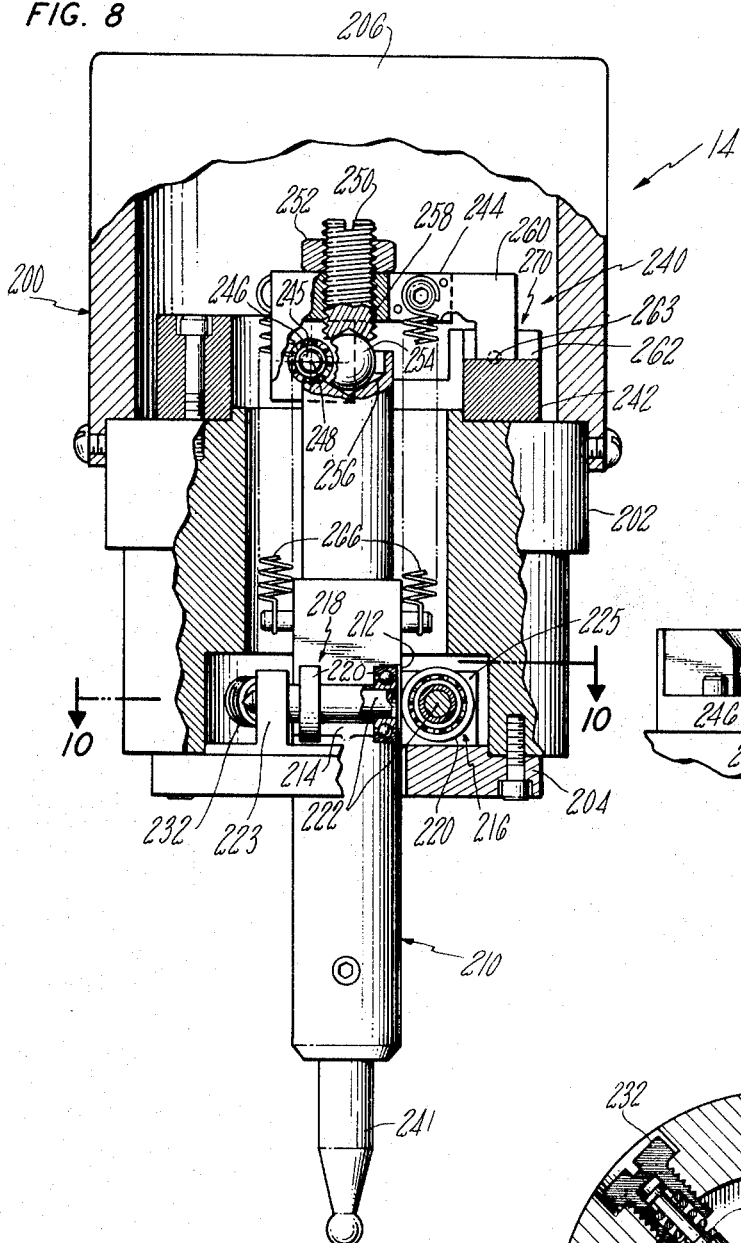
FIG. 8 is an enlarged front elevation view, partly broken away and partly in section, of the depth tracer.
Figure 9:
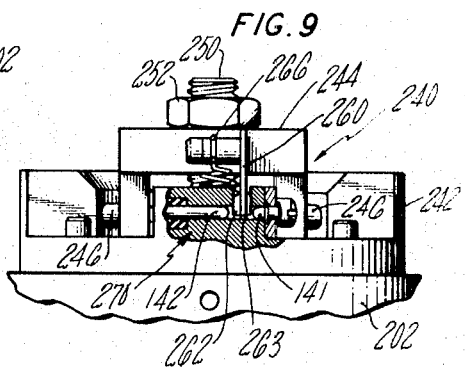
FIG. 9 is an enlarged partial side elevation view, partly broken away and partly in section, of the depth tracer.
Figure 10:
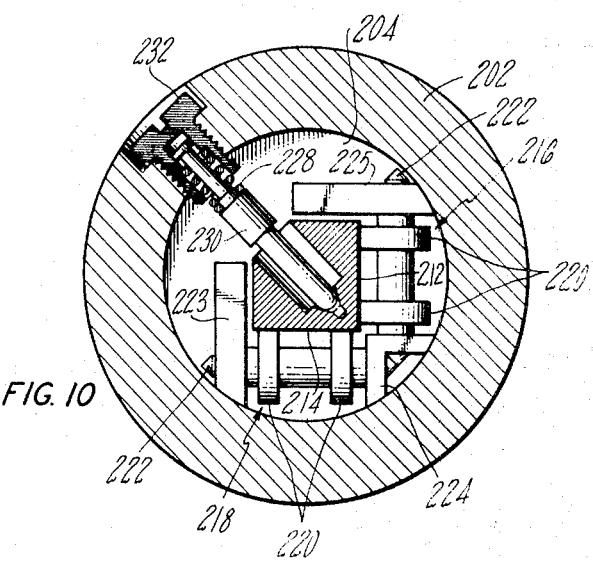
FIG. 10 is a transverse section view, partly in section, of the depth tracer taken substantially along line 10—10 of FIG. 8.

Referring to FIGS. 8–10, the depth tracer 14 comprises a multi-part housing or frame 200 with an intermediate annular support ring 202, and a lower support 204 and upper cover 206 detachably secured to the ring 202. A depending vertical spindle 210 mounted on the housing 200 comprises a pair of flat bearing walls 212, 214 extending parallel to the axis of the spindle and at right angles to each other. Two pairs 216, 218 of ball bearings 220 are mounted on shafts 222 supported on integral stanchions 223–225 of the lower support 204 for engagement with the spindle bearing walls 212, 214 respectively. The shafts 222 are mounted with their axes mutually perpendicular and perpendicular to the vertical or normal axis of the spindle 210 such that the spindle is supported for vertical or axial movement on the bearings 220. The spindle 210 is held in engagement with the bearings 220 by a compression spring 228 acting through a pin 230 having an inner rounded end engaging a tapered seat of the spindle. A screw 232 threaded into the intermediate support ring 202 is provided for mounting the pin 230 and compression spring 228. The common axis of the compression spring 228 and pin 230 lies in the plane of the bearing axes and extends at an angle of substantially 45° to each bearing axis and such that the spindle 210 may be pivoted in any direction while being maintained in engagement with both pairs of bearings 220.

A photoelectric signaling device 240 is provided for controlling the vertical position of the spindle slide 33 in the manner of the control of the table position and cross slide position by the profile tracer 12. A support ring 242 of the signaling device 240 is secured to the upper face of the intermediate ring 202 coaxially with the vertical axis of the spindle 210 and a lever arm 244 is supported (by ball bearings 245 mounted on a pair of aligned pivot pins 246 extending inwardly from the support ring 242) for pivotal movement about an axis 248 extending perpendicular to and laterally offset from the vertical spindle axis. An adjustable threaded stop 250 having a lock nut 252 is mounted on the lever arm 244 above the spindle and a thrust ball bearing 254 is mounted between concave conical seats 256, 258 on opposed ends of the spindle 210 and stop 250 to provide for pivoting the lever arm 244 with the spindle 210 (by axially shifting and/or pivoting the spindle). A mask or shutter 260 is mounted on the lever arm 244 for receipt within a radial slot 262 in the ring 242 and has a downwardly facing straight edge engageable with an upwardly facing straight edge of a stationary mask 263 formed on the ring 262. The stationary mask 263 thereby forms a stop for limiting the pivotal motion of the lever arm 244 in the clockwise direction as viewed in FIG. 8.

A pair of identical tension springs 266 are connected between the lever arm 244 and spindle 210 for biasing the spindle upwardly into engagement with the lever arm stop 250 and for biasing the lever arm 244, clockwise as viewed in FIG. 8, to pivot the mask 260 into engagement with the stationary mask 263. The axes of the tension springs 266 are parallel to and on opposite sides of and at equal distances from the axis of the spindle 210 for biasing the spindle 210 in the upward direction only. The tension springs are, however, unevenly spaced from the pivot axis 248 on opposite sides thereof to provide for biasing the lever arm 244 in the clockwise direction as viewed in FIG. 8.

A photoelectric unit 270, comprising an infrared transmitter diode 141 and a photoelectric receiver diode 142, is mounted within aligned bores in the support ring 242 along an axis parallel to the pivotal axis 248 of the lever arm 244 and with the diodes 141, 142 on opposite sides of the stationary mask 263. The stationary mask 263 is dimensioned to mask approximately a one-third peripheral portion of the transmitter diode 141 and the pivotal mask 260 and stationary mask 263 cooperate to control the intensity of the radiant energy on the photoelectric receiver diode 142 in the manner of the stationary and reciprocable masks of the profile tracer 12. Also, the pivotal mask 260 covers approximately a one-third peripheral portion of the transmitter diode 141 (and is therefore spaced from the stationary mask 263 by an amount equal to approximately one-third the diameter of the transmitter diode 141) when the spindle is in a "neutral" position. The photoelectric receiver diode 142 forms a part of a control circuit (not shown but which may be substantially identical to the control circuits 158) for operating a feed screw motor (not shown) for controlling the vertical position of the spindle slide 33 (along the Z axis) in the manner the profile tracer 12 controls the movement of the table and cross slide (along the X and Y axes respectively).

Referring to FIG. 8, the vertical or normal axis of the spindle 210 lies approximately one-fifth the distance between the pivotal axis 248 of the lever arm 244 and the vertical center line of the photoelectric unit 270 and therefore any vertical motion of the spindle 210 is amplified (in the shown embodiment approximately five times) to provide a very sensitive mask control. Also, any lateral deflection of the tracing stylus 241 causes pivotal movement of the lever arm 244 which is amplified through the action of the thrust ball bearing 254 on the conical seat 256. Accordingly where the tracing stylus 241 is deflected laterally due for example to engagement with a steep template surface, the photoelectric unit 270 will be operated to generate a signal for suitably raising the spindle slide 33.

As will be apparent to persons skilled in the art, various modifications, adaptations and variations of the foregoing specific disclosure can be made without departing from the teachings of the present invention.

I claim:

1. In a tracing system useful with a workpiece template for operating reversible motor means of a machine tool in reverse directions thereof for machining a workpiece in accordance with the contour of the template, comprising a support, a tracing spindle mounted on the support having a tracing stylus cooperable with a template for displacement in opposite directions through an established intermediate position thereof in accordance with the contour of the template and the operation of the reversible motor means, and motor control means for operating the motor means in reverse directions thereof in accordance with the displacement of the tracing stylus in opposite directions thereof respectively from its established intermediate position, the improvement wherein the motor control means comprises a photoelectric unit having a radiant energy transmitter, a photoelectric receiver mounted in alignment with the transmitter for receiving radiant energy therefrom, and a mask mounted intermediate the transmitter and receiver for being shifted for varying the intensity of radiant energy on the receiver and connected to the spindle to be shifted in opposite directions as the stylus is disposed in opposite directions respectively through its said established intermediate position, the shiftable mask being positioned, with the spindle in its said established intermediate position, for masking a first significant portion of the transmitter for masking from the receiver a first significant amount of the radiant energy from the transmitter, and with a second significant portion of the transmitter unmasked to permit receipt on the receiver of a second base level amount of radiant energy from the transmitter, and means operable by the photoelectric receiver for operating the reversible motor means in first and second reverse directions thereof in accordance with the increase and decrease level of radiant energy on the receiver relative to said base level of radiant energy on the receiver.

2. In a tracing system according to claim 1 wherein the motor control means comprises adjustable means for establishing the intermediate position of the tracing stylus, where the operation of the reversible motor means is reversed, by adjustment of the base amount of radiant energy on the receiver.

3. In a tracing system according to claim 1 wherein said photoelectric unit comprises a stationary mask intermediate the transmitter and receiver for masking a third peripheral portion of the transmitter and wherein the shiftable mask and stationary mask are relatively positioned and contoured so that the shiftable mask is shifted by the spindle toward and away from the stationary mask for varying the intensity of radiant energy on the receiver.

4. In a tracing system according to claim 3 wherein the shiftable and stationary masks have opposed complementary mask edges.

5. In a tracing system according to claim 3 wherein the shiftable and stationary masks provide for masking substantially equal peripheral portions of the transmitter with the stylus in its established intermediate position.

6. In a tracing system according to claim 1 wherein the reversible motor means provides at least two dimensional control of the machining operation, wherein the spindle is mounted for two dimensional displacement of the tracing stylus, and wherein the motor control means comprises a pair of said photoelectric units with shiftable masks connected to the spindle to be shifted in opposite directions in accordance with the displacement vectors of the tracing stylus along mutually perpendicular axes respectively, and wherein the shiftable masks of the pair of photoelectric units are provided by a single masking member.

7. In a tracing system according to claim 6 wherein said single masking member is circular.

8. In a tracing system according to claim 6 wherein each of the photoelectric units comprises a stationary mask intermediate the transmitter and receiver for masking a third peripheral portion of the transmitter and wherein the shiftable mask and stationary mask of each photoelectric unit are relatively positioned and contoured so that the shiftable mask is shifted by the spindle toward and away from the stationary mask for varying the intensity of radiant energy on the receiver.

9. In a tracing system according to claim 6 wherein the spindle is elongated and the pair of photoelectric units are angularly spaced substantially 90° about the longitudinal axis of the spindle with the tracing stylus in its said intermediate position.

10. In a tracing system according to claim 9 wherein the single masking member is circular.

11. A tracing system according to claim 9 wherein the spindle is mounted to be rotated about its longitudinal axis and further comprising means for rotating the spindle while permitting displacement of the tracing stylus, and means interconnecting the upper end of the spindle with the masking member for shifting the masking member in a direction depending on the direction of displacement of the tracing stylus.

12. A machine tool tracer cooperable with a workpiece template for controlling a workpiece machining operation comprising a support, a tracing spindle mounted on the support for displacement in opposite directions through an established intermediate position thereof and having a tracing stylus cooperable with a workpiece template for displacement in opposite directions through an established intermediate position thereof corresponding to the established intermediate position of the spindle, a photoelectric unit having a radiant energy transmitter, a photoelectric receiver in alignment with the transmitter for receiving radiant energy therefrom for producing a machine tool control signal, a shiftable mask mounted intermediate the radiant energy transmitter and receiver for being shifted for varying the intensity of radiant energy on the receiver and connected to the spindle to be shifted in opposite directions as the tracing stylus is displaced in opposite directions respectively through its established intermediate position, and a stationary mask intermediate the transmitter and receiver for masking a first peripheral portion of the transmitter, the shiftable mask being positioned, with the stylus in its said established intermediate position, for masking a second significant portion of the transmitter for masking from the receiver a first significant amount of radiant energy from the transmitter and with a third significant portion of the transmitter unmasked to permit receipt on the receiver of a second significant base level amount of radiant energy, and the shiftable and stationary masks being relatively and contoured so that the shiftable mask is shifted by the spindle toward and away from the stationary mask for varying the intensity of radiant energy on the receiver, and means operable by the photoelectric receiver for operating the reversible motor means in first and second reverse directions thereof in accordance with the increase and decrease respectively of the level of radiant energy on the receiver relative to said base level of radiant energy on the receiver.

13. A machine tool tracer according to claim 12 wherein the spindle is elongated and is mounted on said support for movement of the tracing stylus in all directions through its said established intermediate position, wherein the tracer comprises a pair of said photoelectric units angularly spaced substantially 90° about the longitudinal axis of the spindle in its established intermediate position, and wherein the shiftable masks of the pair of photoelectric units are provided by a single masking member connected to be shifted by the spindle in a plane substantially perpendicular to the longitudinal axis of the spindle in its said intermediate position for variably masking the radiant energy transmitters of the photoelectric units in accordance with the displacement vectors of the tracing stylus along mutually perpendicular axes respectively.

14. A machine tool tracer according to claim 13 wherein the spindle is mounted for rotation about its longitudinal axis, and wherein the tracer comprises drive means for rotating the spindle about its longitudinal axis without effecting the displacement of the tracing stylus from its established intermediate position, and connector means interconnecting the spindle and masking member for shifting the masking member in accordance with the displacement of the tracing stylus from its established intermediate position.

15. A machine tool tracer cooperable with a workpiece template for controlling a workpiece machining operation comprising a support, a tracing spindle mounted on the support for displacement in opposite directions through an established intermediate position thereof and having a tracing stylus cooperable with a workpiece template for displacement in opposite directions through an established intermediate position thereof corresponding to the established intermediate position of the spindle, a photoelectric unit having a radiant energy transmitter, a photoelectric receiver in alignment with the transmitter for receiving radiant energy therefrom for producing a machine tool control signal, a shiftable mask mounted intermediate the radiant energy transmitter and receiver for being shifted for varying the intensity of radiant energy on the receiver and connected to the spindle to be shifted in opposite directions as the tracing stylus is displaced in opposite directions respectively through its established intermediate position, a stationary mask intermediate the transmitter and receiver for masking a first peripheral portion of the transmitter, the shiftable mask being positioned, with the stylus in its said established intermediate position, for masking a second significant portion of the transmitter and with a third significant portion of the transmitter unmasked, and the shiftable and stationary masks being relatively positioned and contoured so that the shiftable mask is shifted by the spindle toward and away from the stationary mask for varying the intensity of radiant energy on the receiver, the spindle being elongated and being mounted on said support for movement of the tracing stylus in all directions through its said established intermediate position, a pair of said photoelectric units angularly spaced substantially 90° about the longitudinal axis of the spindle in its established intermediate position, and the shiftable masks of the pair of photoelectric units being provided by a single masking member connected to be shifted by the spindle in a plane substantially perpendicular to the longitudinal axis of the spindle in its said intermediate position for variably masking the radiant energy transmitters of the photoelectric units in accordance with the displacement vectors of the tracing stylus along mutually perpendicular axes respectively, the spindle being mounted for rotation about its longitudinal axis, drive means for rotating the spindle about its longitudinal axis without effecting the displacement of the tracing stylus from its established intermediate position, connector means interconnecting the spindle and masking member for shifting the masking member in accordance with the displacement of the tracing stylus from its established intermediate position, the drive means comprising a pivotal drive sleeve surrounding the spindle and pivotal about an axis extending transversely of the longitudinal axis of the spindle in its established intermediate position, the drive sleeve having a pair of diametrically opposed slots, and a pair of guide rollers received within said slots and mounted on the spindle for rotation about an axis extending generally parallel to the pivotal axis of the drive sleeve.

16. A machine tool tracer cooperable with a workpiece template for controlling a workpiece machining operation comprising a support, a tracing spindle mounted on the support for displacement in opposite directions through an established intermediate position thereof and having a tracing stylus cooperable with a workpiece template for displacement in opposite directions through an established intermedaite position thereof corresponding to the established intermediate position of the spindle, a photoelectric unit having a radiant energy transmitter, a photoelectric receiver in alignment with the transmitter for receiving radiant energy therefrom for producing a machine tool control signal, a shiftable mask mounted intermediate the radiant energy transmitter and receiver for being shifted for varying the intensity of radiant energy on the receiver and connected to the spindle to be shifted in opposite directions as the tracing stylus is displaced in opposite directions respectively through its established intermediate position, a stationary mask intermediate the transmitter and receiver for masking a first peripheral portion of the transmitter, the shiftable mask being positioned, with the stylus in its said established intermediate position, for masking a second significant portion of the transmitter and with a third significant portion of the transmitter unmasked, and the shiftable and stationary masks being relatively positioned and contoured so that the shiftable mask is shifted by the spindle toward and away from the stationary mask for varying the intensity of radiant energy on the receiver, the spindle being elongated and being mounted to be displaced in opposite directions generally parallel to its longitudinal axis, the shiftable mask being pivotally mounted and connected for being pivotally shifted by the spindle, and the spindle being mounted for pivotal displacement as well as longitudinal displacement and means interconnecting the pivotal mask and spindle for pivoting the mask by pivotal displacement of the spindle.

17. A machine tool tracer according to claim 16 wherein the interconnecting means comprises a pair of opposed ball seats on the mask and at one end of the spindle and a ball bearing received in said opposed seats.

18. A machine tool tracer cooperable with a workpiece template for controlling a workpiece machining operation comprising a support, a tracing spindle mounted on the support for displacement in opposite directions through an established intermediate position thereof and having a tracing stylus cooperable with a workpiece template for displacement in opposite directions through an established intermediate position thereof corresponding to the established intermediate position of the spindle, a photoelectric unit having a radiant energy transmitter, a photoelectric receiver in alignment with the transmitter for receiving radiant energy therefrom for producing a machine tool control signal, a shiftable mask mounted intermediate the radiant energy transmitter and receiver for being shifted for varying the intensity of radiant energy on the receiver and connected to the spindle to be shifted in opposite directions as the tracing stylus is displaced in opposite directions respectively through its established intermediate position, a stationary mask intermediate the transmitter and receiver for masking a first peripheral portion of the transmitter, the shiftable mask being positioned, with the stylus in its said established intermediate position, for masking a second significant portion of the transmitter and with a third significant portion of the transmitter unmasked, and the shiftable and stationary masks being relatively positioned and contoured so that the shiftable mask is shifted by the spindle toward and away from the stationary mask for varying the intensity of radiant energy on the receiver, the spindle being elongated and being mounted on said support for movement of the tracing stylus in all directions through its said established intermediate position, a pair of said photoelectric units angularly spaced substantially 90° about the longitudinal axis of the spindle in its established intermediate position, the shiftable masks of the pair of photoelectric units being provided by a single masking member connected to be shifted by the spindle in a plane substantially perpendicular to the longitudinal axis of the spindle in its said intermediate position for variably masking the radiant energy transmitters of the photoelectric units in accordance with the displacement vectors of the tracing stylus along mutually perpendicular axes respectively, a ball and socket support for the spindle for mounting the spindle for pivotal movement in all directions from its established intermediate position and contoured to longitudinally shifted the spindle upon pivotal displacement thereof, and a control switch connected to be actuated by the spindle upon a predetermined longitudinal displacement thereof.

19. A machine tool tracer cooperable with a workpiece template for controlling a workpiece machining operation comprising a support, a tracing spindle mounted on the support for displacement in opposite directions through an established intermediate position thereof and having a tracing stylus cooperable with a workpiece template for displacement in opposite directions through an established intermediate position thereof corresponding to the established intermediate position of the spindle, a photoelectric unit having a radiant energy transmitter, a photoelectric receiver in alignment with the transmitter for receiving radiant energy therefrom for producing a machine tool control signal, a shiftable mask mounted intermediate the radiant energy transmitter and receiver for being shifted for varying the intensity of radiant energy on the receiver and connected to the spindle to be shifted in opposite directions as the tracing stylus is displaced in opposite directions respectively through its established intermediate position, a stationary mask intermediate the transmitter and receiver for masking a first peripheral portion of the transmitter, the shiftable mask being positioned, with the stylus in its said established intermediate position, for masking a second significant portion of the transmitter and with a third significant portion of the transmitter unmasked, and the shiftable and stationery masks being relatively positioned and contoured so that the shiftable mask is shifted by the spindle toward and away from the stationary mask for varying the intensity of radiant energy on the receiver, the spindle being elongated and being mounted to be displaced in opposite directions generally parallel to its longitudinal axis and the shiftable mask being pivotally mounted for pivotal movement about an axis extending substantially perpendicular to and laterally offset from the longitudinal axis of the spindle and being connected for being pivotally shifted by the spindle, and spring means interconnecting the spindle and pivotal mask for biasing the mask in one pivotal direction for increasingly masking the transmitter and biasing the spindle in a longitudinal direction toward the mask.

* * * * *